United States Patent Office 3,644,547
Patented Feb. 22, 1972

3,644,547
ISOMERIZATION OF ALKYL HALIDES
Louis Schmerling, Riverside, Ill., assignor to Universal Oil Products Company, Des Plaines, Ill.
No Drawing. Filed Aug. 28, 1968, Ser. No. 755,789
Int. Cl. C07c 17/24
U.S. Cl. 260—658 R                10 Claims

ABSTRACT OF THE DISCLOSURE

Alkyl halides are isomerized by treating a particular alkyl halide with an aqueous hydrohalic acid at elevated temperatures above about 200° C. whereby the halogen substituent is transferred to a carbon atom different from that of the original compound.

---

This invention relates to a process for the isomerization of alkyl halides. More specifically, the invention is concerned with the treatment of alkyl halides with a hydrohalic acid at an elevated temperature whereby the halogen atom is transferred to a carbon atom separate and distinct from that in which the halogen substituent was originally present.

Alkyl halides of a specific and particular configuration are useful intermediates in the preparation of many organic chemicals. Primary alkyl halides find many uses, for example, in the synthesis of flavors, perfumes, medicines, dyes, and resins. They may also be converted to primary alcohols, primary amine, fatty acids, n-alkanesulfonic acids, and other desirable compounds.

While the aforementioned discussion has been centered on the preparation of aliphatic compounds containing halogen substituents on the 1-position, it is also contemplated within the scope of this invention that alkyl halides which are normal in configuration and contain a terminal halogen substituent, may be isomerized to alkyl halides containing an internal or secondary halogen substituent.

It is therefore an object of this invention to provide a process for the isomerization of straight-chain alkyl halides.

A further object of this invention is to isomerize straight-chain alkyl halides by treating said halides with an acid compound at elevated temperatures.

One aspect of this invention may be found in a process for the isomerization of straight-chain alkyl halide which comprises treating said alkyl halide with an aqueous hydrohalic acid at an elevated temperature above about 200° C., and recovering the isomerized alkyl halide.

Another aspect of this invention is found in a process for the isomerization of straight-chain alkyl halide which comprises treating isopropyl chloride with an aqueous hydrohalic acid containing from about 15% to about 38% of hydrochloric acid at a temperature of about 200° C. and recovering the resultant n-propyl chloride.

Other objects and embodiments will be found in the following further detailed description of the present invention.

As hereinbefore set forth, the present invention is concerned with a process for the isomerization of straight-chain alkyl halides whereby secondary halides will be converted to terminal halides and terminal halides will be converted to secondary halides. The isomerization is effected at elevated temperatures above about 200° C. and preferably in a range of from about 200° C. to about 300° C. It is contemplated within the scope of this invention that superatmospheric pressuress ranging from 2 to about 100 atmospheres may be employed, the pressure being provided for by the introduction of an inert gas such as nitrogen into the reaction zone or it may be the autogenous pressure of the reactant. The amount of pressure which is used is that which is sufficient to maintain a major portion of the reactants in the liquid phase. The medium in which this isomerization is effected comprises an aqueous hydrohalic acid. The preferred hydrohalic acids comprise hydrochloric acid and hydrobromic acid; hydrofluoric acid and hydroiodic acid are also considered within the scope of this invention, but are generally less deirable, and when used, may not necessarily result in obtaining the isomerization with equivalent results. The preferred aqueous hydrohalic acids will contain hydrochloric acid in an amount ranging from about 15% to about 38% concentration and hydrobromic acid ranging from about 15% to about 48% concentration.

Examples of alkyl halides which may be isomerized according to the process of this invention include n-propyl chloride, n-propyl bromide, isopropyl chloride, isopropyl bromide, 1-chlorobutane, 1-bromobutane, 2-chlorobutane, 2-bromobutane, 1-chloropentane, 1-bromopentane, 2-chloropentane, 2-bromopentane, 3-chloropentane, 3-bromopentane, 1-chlorohexane, 1-bromohexane, 2-chlorohexane, 2-bromohexane, 3-chlorohexane, 3-bromohexane, 1-chloroheptane, 1-bromoheptane, 2-chloroheptane, 2-bromoheptane, 3-chloroheptane, 3-bromoheptane, 1-chlorooctane, 1-bromooctane, 2-chlorooctane, 2-bromooctane, 3-chlorooctane, 3-bromooctane, 4-chlorooctane, 4-bromooctane, 1-chlorononane, 1-bromononane, 2-chlorononane, 2-bromononane, 3-chlorononane, 3-bromononane, 5-chlorononane, 1-chlorodecane, 1-bromodecane, 2-chlorodecane, 2-bromodecane, 3-chlorodecane, 3-bromodecane, 1-chloroundecane, 1-bromoundecane, 2-chloroundecane, 2-bromoundecane, 3-chloroundecane, 3-bromoundecane, 6-bromoundecane, 1-chlorododecane, 1-bromododecane, 2-chlorododecane, 2-bromododecane, 3-chlorododecane, 3-bromododecane, 6-chlorododecane, 1-chlorotridecane, 1-bromotridecane, 2-chlorotridecane, 2-bromotridecane, 3-chlorotridecane, 3-bromotridecane, 6-bromotridecane, 1-chlorotetradecane, 1-bromotetradecane, 2-chlorotetradecane, 2-bromotetradecane, 6-chlorotetradecane, 7-bromotetradecane, 1-chlorohexadecane, 1-bromohexadecane, 2-chlorohexadecane, 2-bromohexadecane, 3-chlorohexadecane, 3-bromohexadecane, etc. It is also contemplated within the scope of this invention that the corresponding fluoro- and iodo-substituted alkanes may be isomerized, although not necessarily with equivalent results.

The process of this invention may be effected in any suitable manner and may comprise either a batch or continuous type operation. For example, when a batch type operation is used, a quantity of the alkyl halide which is to undergo isomerization is placed in an appropriate apparatus such as, for example, a stirred reaction flask or, if superatmospheric pressures are to be employed, an autoclave of the rotating or mixing type. In addition, the hydrohalic acid is also placed in the reaction vessel which is thereafter heated to the desired operating temperature. After maintaining the vessel at the desired operating temperature and, if so desired, operating pressure, for a predetermined residence time, which may range from about 0.5 up to about 10 hours or more in duration, the apparatus and contents thereof are cooled to room temperature. The reaction mixture is recovered and subjected to separation means whereby the organic layer is separated from the aqueous layer and the former is then subjected to fractional distillation whereby the isomerized alkyl halide is recovered.

It is also contemplated that the isomerization reaction of the present invention may be effected in a continual manner of operation. When such a type of operation is used, the starting material comprising the alkyl halide which is to be isomerized is continuously charged to a reaction vessel which is maintained at the proper operating conditions of temperature and pressure. In addition, the hydrohalic acid is also charged to the reaction vessel through a separate line or, if so desired, the acid may be admixed with the alkyl halide prior to entry into the said reactor and the resulting mixture charged thereto in a single stream. Upon completion of the desired residence time, the reactor effluent is continuously withdrawn and subjected to separation means whereby the hydrohalic acid is separated from the organic layer and recycled to form a portion of the feed stock. The organic layer is also subjected to separation means, usually by fractional distillation, whereby the unreacted alkyl halide is separated from the isomerized product, the former then being recycled to form a portion of the feed stock while the latter is recovered.

Examples of alkyl halides which may be prepared according to the process of this invention include n-propyl chloride, n-propyl bromide, isopropyl chloride, isopropyl bromide, 1-chlorobutane, 1-bromobutane, 2-chlorobutane, 2-bromobutane, 1-chloropentane, 1-bromopentane, 2-chloropentane, 2-bromopentane, 3-chloropentane, 3-bromopentane, 1-chlorohexane, 1-bromohexane, 1-chloroheptane, 3-chloroheptane, 1-bromoheptane, 1-chlorooctane, 1-bromooctane, 1-chlorononane, 1-bromononane, 4-bromononane, 1-chlorodecane, 1-bromodecane, 1-chloroundecane, 1-bromoundecane, 1-chlorododecane, 1-bromododecane, 1-chlorotridecane, 4-chlorotridecane, 1-bromotridecane, 1-chlorotetradecane, 1-bromotetradecane, 5-bromotetradecane, 1-chlorohexadecane, 1-bromohexadecane, 5-chlorohexadecane, etc.

The following examples are given to illustrate the process of the present invention which, however, are not intended to limit the generally broad scope of the present invention in strict accordance therewith.

EXAMPLE I

A mixture of 80 grams of isopropyl chloride and 72 grams of a concentrated aqueous hydrohalic acid containing 37% hydrochloric acid was placed in the glass liner of a rotating autoclave. The autoclave was sealed and nitrogen pressed in until an initial pressure of 30 atmospheres was reached. The autoclave was then heated to a temperature of 225° C. and maintained thereat for a period of 8 hours, during which time the pressure rose to 105 atmospheres. At the end of this time, heating was discontinued and the autoclave allowed to return to room temperature, the final pressure at room temperature being 30 atmospheres. The excess pressure was discharged and the liquid product was recovered. Analysis of the product by means of a gas-liquid chromatograph disclosed the presence of n-propyl chloride in the reaction mixture.

EXAMPLE II

In this example 88 grams (0.5 mole) of 2-chlorodecane and 36.5 grams (1.0 mole) of a cencentrated hydrochloric acid are placed in the glass liner of a rotating autoclave. The autoclave is sealed and 10 atmospheres of nitrogen is pressed in. Following this, the autoclave is heated to a temperature of 225° C. and maintained thereat for a period of 8 hours. At the end of this time, the autoclave is allowed to cool to room temperature, the excess pressure is discharged and the autoclave is opened. The reaction product is recovered and separated from the aqueous layer. After neutralizing, washing and drying, the product is subjected to analysis by means of a gas-liquid chromatograph, said analysis disclosing the presence of 1-chlorodecane.

EXAMPLE III

A mixture of 112.5 grams (0.5 mole) of 2-bromododecane and 81 grams (1.0 mole) of an aqueous hydrobromic acid solution containing 48% hydrobromic acid is placed in the glass liner of a rotating autoclave which is thereafter sealed and pressured with nitrogen until an initial pressure of 25 atmospheres is reached. The autoclave is then heated to a temperature of 225° C. and maintained thereat for a period of 8 hours. At the end of this time, heating is discontinued and the autoclave allowed to cool. Upon reaching room temperature, the excess pressure is discharged and the autoclave is opened. The reaction (mixture is separated) from the aqueous acid layer, neutralized, washed and dried. Analysis of the product by means of a gas-liquid chromatograph will disclose the presence of 1-bromododecane.

EXAMPLE IV

A mixture of 115 grams (0.5 mole) of 2-chlorotetradecane and 36 grams of concentrated aqueous hydrochloric acid solution containing 38% hydrochloric acid is placed in the glass liner of a rotating autoclave which is thereafter sealed. Nitrogen is pressed into a pressure of 25 atmospheres, the autoclave is heated to a temperature of 250° C. and maintained thereat for a period of 8 hours. At the end of this time, the autoclave is allowed to return to room temperature and upon reaching said temperature, the excess pressure is discharged. The autoclave is opened and the reaction mixture is treated in a manner similar to that hereinbefore set forth, the analysis by means of a gas-liquid chromatograph disclosing the presence of 1-chlorotetradecane.

EXAMPLE V

In this example, 138 grams of 2-bromobutane and 80 grams of a concentrated hydrobromic acid solution containing 48% hydrobromic acid is placed in the glass liner of a rotating autoclave. The mixture is thereafter treated in a manner hereinbefore set forth, that is, by pressuring with nitrogen and heating at a temperature of 225° C. for a period of 8 hours. After cooling to room temperature, discharging the excess pressure, and treating the reaction mixture in a manner also similar to that hereinbefore set forth, the reaction product is recovered. Analysis of the organic product by means of a gas-liquid chromatograph will disclose the presence of 1-bromobutane.

EXAMPLE VI

To illustrate the isomerization of normal halides to secondary halides, a mixture of 80 grams of normal propyl chloride and 75 grams of a concentrated hydrochloric acid solution were placed in the glass liner of a rotating autoclave. The autoclave was sealed and nitrogen pressed in until an initial pressure of 30 atmospheres was reached. The autoclave was then heated to a temperature of 225° C. and maintained thereat for a period of 8 hours, the maximum pressure during this time reaching 88 atmospheres. Upon cooling the autoclave to room temperature, the initial pressure dropped to 30 atmospheres. This pressure was discharged and the liquid product was recovered. An analysis of this product by means of a gas-liquid chromatograph disclosed that the product contained isopropyl chloride.

EXAMPLE VII

To illustrate the fact that the hydrohalic acid need not contain the same halogen substituent as the alkyl halide, 43 grams of normal propyl chloride was heated with 77 grams of aqueous hydrobromic acid containing 48% hydrobromic acid. The reaction was effected in the glass liner of a rotating autoclave under 30 atmospheres of initial nitrogen pressure for a period of 8 hours at 225° C. Upon completion of the desired residence time, the reaction mixture was recovered in a manner similar to that set forth above and the product subjected to analysis. The mixture consisted of 48 weight percent of isopropyl chloride, 12% of normal propylchloride (i.e., 20% of the propyl chloride), 29 weight percent of isopropyl bromide and 11 weight percent of n-propyl bromide (i.e., 27.5% of the propyl bromide).

I claim as my invention:

1. A process for the isomerization of a straight chain alkyl halide in which the halogen is chlorine or bromine which comprises treating said alkyl halide with an aqueous hydrohalic acid at a temperature of about 200° to 300° C. and a pressure sufficient to maintain a major portion of the reactants in the liquid phase, and recovering the isomerized alkyl halide.

2. The process as set forth in claim 1 in which said aqueous hydrohalic acid is hydrochloric acid.

3. The process as set forth in claim 1 in which said aqueous hydrohalic acid is hydrobromic acid.

4. The process as set forth in claim 2 in which said aqueous hydrohalic acid contains from about 15% to about 38% hydrochloric acid.

5. The process as set forth in claim 3 in which said aqueous hydrohalic acid contains from about 15% to about 48% hydrobromic acid.

6. The process as set forth in claim 1 in which said alkyl halide comprises isopropyl chloride and said isomerized alkyl halide comprises n-propyl chloride.

7. The process as set forth in claim 1 in which said alkyl halide comprises 2-chlorodecane and said isomerized alkyl halide comprises 1-chlorodecane.

8. The process as set forth in claim 1 in which said alkyl halide comprises 2-bromododecane and said isomerized alkyl halide comprises 1-bromododecane.

9. The process as set forth in claim 1 in which said alkyl halide comprises 2-chlorotetradecane and said isomerized alkyl halide comprises 1-chlorotetradecane.

10. The process as set forth in claim 1 in which said alkyl halide comprises 2-bromobutane and said isomerized alkyl halide comprises 1-bromobutane.

References Cited
UNITED STATES PATENTS 2,315,871    4/1943    Oberfell et al. _____ 260—658 R LEON ZITVER, Primary Examiner J. A. BOSKA, Assistant Examiner